July 28, 1953  C. E. READ ET AL  2,646,859
PISTON ASSEMBLY FOR SHOCK ABSORBERS
Filed June 30, 1949

INVENTORS
Charles E. Read
Ralph H. Whisler Jr.
BY
Harness, Dickey & Pierce
ATTORNEYS

Patented July 28, 1953

2,646,859

UNITED STATES PATENT OFFICE 2,646,859

PISTON ASSEMBLY FOR SHOCK ABSORBERS

Charles E. Read and Ralph H. Whisler, Jr., Monroe, Mich., assignors to Monroe Auto Equipment Company, Monroe, Mich., a corporation of Michigan Application June 30, 1949, Serial No. 102,414

1 Claim. (Cl. 188—88)

This invention relates generally to piston assemblies, and refers more particularly to improvements in piston assemblies of the type employed in tubular direct-acting shock absorbers.

It is an object of this invention to provide a piston assembly having means for controlling the upward flow of hydraulic medium through the piston, from the lower portion of the pressure cylinder to the upper portion thereof, so that the full volume of the pressure cylinder, instead of the usual piston rod displacement only, will be utilized for obtaining the desired shock absorber action.

It is a still further object of this invention to provide in a piston assembly of the aforementioned type, a novel resilient cup-type seal between the piston and wall of the pressure cylinder, which seal permits the flow of oil thereby upon movement of the piston in one direction and prevents the flow of oil thereby upon movement of the piston in the opposite direction.

An object of this invention is to provide a compact unitary piston assembly constructed to enable flow of fluid in opposite directions past the piston and having separate valve means operable independently to control the flow of fluid in opposite directions past the piston.

Another object of this invention is to provide a piston assembly wherein the valves are of the pressure-operated type arranged to control both the compression and rebound strokes of the piston within accurate preselected limits.

A further object of this invention is to provide a construction wherein the various parts of the piston, including the valves, are secured together to form a compact assembly by the piston operating plunger.

The foregoing as well as other objects will be made more apparent as this description proceeds, especially when considered in connection with the accompanying drawing, wherein.

Figures 1, 2, 3, 4:
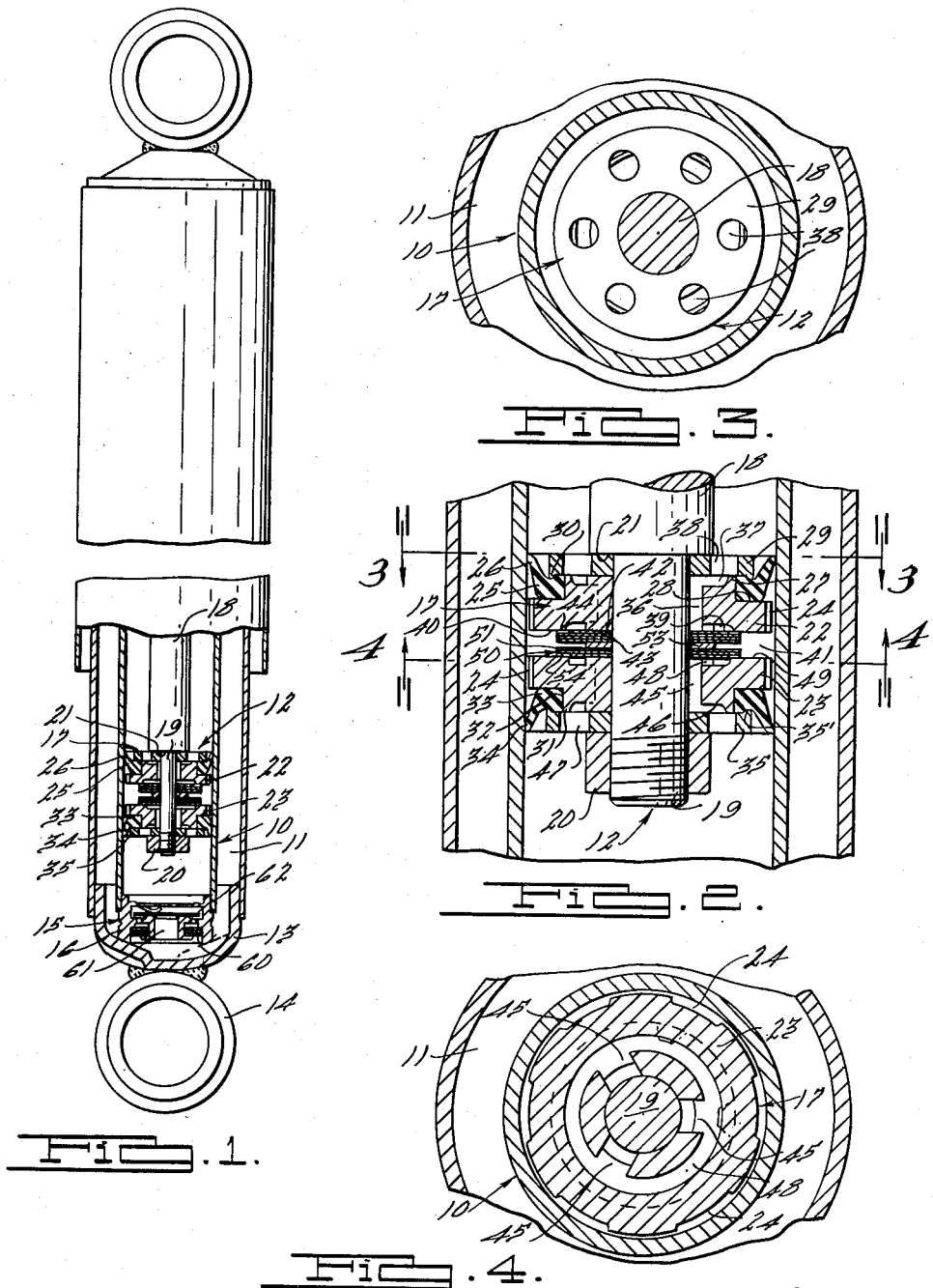
Figure 1 is a side elevational view, with parts broken away in section, of a tubular, direct-acting hydraulic shock absorber embodying a piston assembly constructed in accordance with this invention.
Figure 2 is an enlarged sectional view of the piston assembly shown in Figure 1.
Figure 3 is a cross-sectional view taken substantially on the plane indicated by the line 3—3 of Fig. 2.
Figure 4 is a cross-sectional view partly broken away and taken substantially on the line 4—4 of Fig. 2.

Figure 1 of the drawing illustrates a typical tubular direct-acting hydraulic shock absorber comprising a pressure cylinder 10, a reserve chamber 11 and a piston assembly 12. In accordance with conventional practice, both the reserve chamber and pressure cylinder are filled with a suitable hydraulic fluid medium when the shock absorber is in use. The lower end of the reserve chamber is closed by a suitable cap 13 and an attaching bracket 14 is secured to the base of the cap 13. The lower end of the cylinder 10 is closed by a valve assembly 15 having a casing 16 seated on the cap 13 in a manner to support the pressure cylinder 10 in concentric relation to the reserve chamber. The upper ends of both the reserve chamber and cylinder are closed by suitable sealing means forming no part of the present invention and, accordingly, are not shown herein.

In general the piston assembly 12 comprises a composite piston 17 and piston rod 18 having a reduced threaded portion 19 projecting downwardly from the lower end thereof for receiving a clamping nut 20. The rod 18 is adapted to extend into the pressure cylinder 10 through the sealing means at the upper end of the pressure cylinder and the clamping nut 20 cooperates with an annular shoulder 21 formed on the rod 18 by the reduced portion 19 to secure the several parts of the composite piston 17 in assembled relationship.

The composite piston 17 comprises two parts 22 and 23 slidably supported in the pressure cylinder 10 by piston rod 18. The two parts are centrally apertured to receive the reduced parts of the portion 19 of the plunger 18 and are secured to the plunger in spaced relation to each other axially of the pressure cylinder 10 in a manner to be more fully hereinafter described.

The peripheral portions of the two piston parts are formed with axially extending circumferentially spaced grooves 24 to enable relatively free passage of fluid in opposite directions past the piston. However, the flow of fluid past the piston 17 upon the rebound stroke, or upon upward movement of the piston relative to the cylinder 10, is prevented by an annular sealing element 25 having an upwardly extending lip 26 engageable with the inner wall of the cylinder. As shown particularly in Figure 2 of the drawing, the piston part 22 has a reduced upwardly extending portion 27, which provides an annular recess 28 for receiving the sealing member 25. A washer 29 is seated on the top surface of the reduced portion 27 and is formed with an annular depending flange 30 for engagement with the sealing member to clamp the latter against the piston part 22. Thus it will be noted that when the piston 17 is on its rebound stroke, the pressure of the fluid in the cylinder 10 above the piston acts on the lip 26 of the sealing member 25 and urges the lip into intimate frictional contact with the inner wall of the cylinder. However, when the piston 17 is on its compression stroke, fluid flowing through the grooves 24 in the periphery of the piston part 22 may readily escape past the annular lip 26 to the upper end of the cylinder.

In the interests of economy in manufacture, the piston part 23 is identical to the piston part 22. However, it will be noted from Figure 2 of the drawing that the piston part 23 is secured in the assembly in an inverted position with respect to the piston part 22. In detail, the depending reduced portion 31 of the piston part 23 forms an annular recess 32 for receiving a sealing element 33 similar to the sealing element 25 in that it is provided with an annular resilient lip 34. The sealing element 33, however, is inverted with respect to the sealing element 25, so that the lip 34 projects downwardly and engages the inner wall of the cylinder 10. A washer 35, similar to the washer 29, is seated on the bottom face of the reduced portion 31 and is provided with an annular upwardly extending flange 35' for engaging the sealing member 33 to clamp the latter against the piston part 23. Thus it will be noted that when the piston 17 is on its compression stroke, the fluid in the cylinder 10 below the piston acts on the annular lip 34 of the sealing member 35 and urges the lip into frictional engagement with the inner wall of the cylinder. However, when the piston 17 is on its rebound stroke, fluid flowing downwardly through the grooves 24 in the piston part 23 may readily escape past the lip 34.

Referring again to Figure 2 of the drawing, it will be noted that the central opening in the piston part 22 is cut away at circumferentially spaced points to provide fluid passages 36 through the piston part 22. The upper ends of the passages 36 communicate with an annular groove 37 formed in the top face of the piston part 22, and the washer 29 is provided with circumferentially spaced ports 38 arranged to register with the annular groove 37. The lower ends of the passages 36 communicate with an annular groove 39 formed in the bottom face of the piston part 22 and a valve seat 40 surrounds the groove 39. Thus when the piston 17 is on its rebound stroke, the fluid in the cylinder 10 above the piston may flow through the passages 36 to the space 41 between the piston parts 22 and 23.

However, the flow of fluid from the passage 36 to the space 41 is controlled by a pressure-operated valve 42 of any suitable type, but herein illustrated as comprising a plurality of spring metal disks 43 arranged in superposed relation on the bottom face of the piston part 22 and having the peripheral portions engaging the annular seat 40. The valve disks 43 are centrally apertured to receive the reduced portion 19 of the piston-operating plunger 18 and the portions of the disks adjacent the openings therethrough are clamped to the piston part 22 by the nut 20, so that the peripheral portions of the disks are held under tension against the valve seat 40. As a result, the passages 36 are maintained closed by the valve 42 until the pressure of the fluid exceeds the force required to flex the peripheral portions of the valve disks away from the annular seat 40. It will, of course, be understood that the number of the disks 43 or the tension of the disks may be varied to enable opening of the valve at the required pressures. The pressure characteristics of the shock absorber on the rebound stroke of the piston may be determined by providing the disk 43 immediately adjacent the valve seat 40 with one or more slots 44. These slots provide a permanent bleed around the valve 42, and of course may be varied in size or number to obtain different operating characteristics.

The central opening through the piston part 23 is also cut away at circumferentially spaced points to form vertical passages 45 through the piston part 23. The lower ends of the passages 45 communicate with an annular recess 46 formed in the bottom surface of the piston part 23 and the washer 35 is formed with a series of circumferentially spaced ports 47 adapted to register with the recess 46. The upper ends of the passages 45 communicate with an annular recess 48 formed in the top surface of the piston part 23 and an annular valve seat 49 surrounds the recess 48. The construction is such that on the compression stroke of the piston, fluid in the cylinder below the piston is permitted to flow upwardly through the passages 45 to the space 41 between the piston parts. This directional flow of fluid is controlled by a pressure-operated valve 50 comprising a plurality of spring metal disks 51 arranged in superposed relation on the top surface of the piston part 23 and spaced from the valve 42 by a spacer 53 centrally apertured to receive the reduced portion 19 of the piston operating plunger. The valve disks 51 are also centrally apertured to receive the reduced portion 19 of the plunger 18 and the peripheral portions of the disks are engaged with the valve seat 49 under tension. Thus the flow of fluid from the passages 45 into the space 41 is prevented by the valve 50 until the pressure of this fluid exceeds the force holding the valve 50 in its closed position. This force may, of course, be varied by altering the number of disks 51 or by varying the tension under which the disks are held in contact with the valve seat 49. The lowermost disk adjacent the valve seat 49 is formed with slots 54 to provide a permanent bleed passage around the valve 50. The size and/or number of the slots determine the amount of fluid by-passed, and may be varied to provide the required pressure characteristics.

All of the various parts of the composite piston 17, including the washers, piston parts, valve disks and spacer 53, are centrally bored to receive the reduced portion 19 of the piston rod 18. The washer 29 is seated against the shoulder 21 on the rod 18, and the nut 20 is adapted to engage the washer 35, so that by tightening the nut all of the above parts of the piston assembly are clamped in assembled relationship.

From the foregoing it will be noted that when the piston 17 is on its compression stroke, fluid in the cylinder 10 below the piston flows through the ports 47 in the washer 35 to the pasages 45 in the piston part 23. When the pressure of this fluid exceeds a predetermined value, the valve 50 is opened, and the fluid is admitted to the space 41 between the piston parts. From the space 41 fluid escapes freely through the grooves 24 in the piston part 22 and around the resilient sealing lip 26 on the seal 25 to the cylinder 10 above the piston 17. On the other hand, when the piston 17 is on its rebound stroke, fluid in the cylinder 10 above the piston 17 flows into the passages 36 through the ports 38 in the washer 29, and when the pressure of this fluid overcomes the force holding the valve 42 in its closed position, the latter valve opens to permit escape of the fluid into the space 41. From the space 41 the fluid flows freely through the grooves 24 in the periphery of the piston part 23 and flows around the sealing lip 34 on the seal 33 into the cylinder 10 below the piston. Thus the rebound and compression strokes of the piston are independently controlled by the two valves 42 and 50.

When the piston 17 is on its compression stroke, fluid in the cylinder 10 below the piston is transferred to the reserve chamber 11 in order to compensate for the displacement of the piston operating plunger 18. This transfer of fluid is controlled by a pressure-operated valve 60, which operates in conjunction with the valve 50 to control the compression stroke of the piston. However, the valve 50 is designed to open at a pressure substantially the same as, or just slightly lower than the valve 60, so that while ample flow of fluid to the cylinder above the piston is assured on the compression stroke of the piston, substantially the full volume of the pressure is utilized in obtaining the necessary control. The cylinder 10 is replenished with fluid upon the rebound stroke of the piston through a passage 61 which is controlled by a valve 62. The valve 62 opens relatively freely, so that there is very little resistance to the transfer of fluid from the reserve chamber to the cylinder. Both the valves 60 and 62 are incorporated in the valve assembly 15 and the detail construction of the latter may be similar to the corresponding valve assembly shown in the F. P. Becker et al. Patent No. 2,078,364, dated April 27, 1937.

Thus, from the foregoing it will be appreciated that the slots 54 in the disk 51 will provide a limited or slight resistance to the upward flow of fluid through the piston during the compression stroke thereof, and that the resistance offered by the remainder of the disks 51 to the upward flow of fluid through the piston 23, during the compression stroke, will be just a little less than or substantially the same as the resistance offered by the compression base valve element 60 to the piston rod displacement, and, therefore, will open just in advance of or simultaneously with the base valve 60. It should also be noted that the base valve 62 will open in advance of the piston valve disks 43 and thus provide the first resistance station for the hydraulic fluid during the rebound stroke of the piston, while the valve 43 provides the second resistance station during the rebound stroke.

Thus, with this construction, the flow of fluid from the lower part of the pressure cylinder upwardly through the pistons to the upper part of the cylinder, as well as the flow of fluid in the opposite direction and through the base valve assembly is positively checked and controlled during the downward compression stroke of the piston assembly. Consequently, the full volume of the pressure cylinder, instead of the usual piston rod displacement only, will be utilized for obtaining the desired shock absorber action.

What is claimed is:

A hydraulic shock absorber, including a pressure cylinder, a reserve chamber, a base compression valve controlling piston rod displacement of the hydraulic fluid from the pressure cylinder to the reserve chamber, a piston assembly within the pressure cylinder having two parts spaced from each other axially of the cylinder, means providing relatively free flow of fluid past the peripheral portions of the parts, a sealing element seated on the outer face of one part and having an outwardly extending annular resilient lip frictionally engageable with the cylinder wall, a second sealing element seated on the outer face of the other part and having an outwardly projecting annular lip frictionally engageable with the cylinder wall, passages in said one part through which hydraulic fluid may flow upwardly from the lower portion of the pressure cylinder to the upper portion thereof when the piston assembly is moved toward the base valve assembly, the sealing element of said one part preventing the flow of fluid between said piston and pressure cylinder during such movement and forcing the fluid through said passages, and valve means for said passages positively controlling the upward flow of hydraulic medium through said piston assembly part so that the full volume of the pressure cylinder may be utilized to obtain a predetermined shock absorber action, said valve means for said passages being so constructed that resistance offered thereby to the upward flow of fluid will be just a little less than or substantially the same as the resistance offered by the base compression valve to the piston rod displacement.

CHARLES E. READ.
RALPH H. WHISLER, Jr.

References Cited in the file of this patent

UNITED STATES PATENTS

| Number | Name | Date |
|---|---|---|
| 1,172,315 | Service | Feb. 22, 1916 |
| 1,596,445 | Morinelli | Aug. 17, 1926 |
| 1,923,011 | Moulton | Aug. 15, 1933 |
| 1,930,687 | Moulton | Oct. 17, 1933 |
| 1,958,489 | Moulton | May 15, 1934 |
| 2,018,312 | Moulton | Oct. 22, 1935 |
| 2,225,986 | Glezen | Dec. 24, 1940 |
| 2,346,275 | Read et al. | Apr. 11, 1944 |
| 2,351,662 | Christofel | June 20, 1944 |
| 2,579,058 | Trimble et al. | Dec. 18, 1951 |